(12) United States Patent
Ko et al.

(10) Patent No.: US 10,913,361 B2
(45) Date of Patent: Feb. 9, 2021

(54) BATTERY TEMPERATURE CONTROL SYSTEM AND METHOD

(71) Applicants: HYUNDAI MOTOR COMPANY, Seoul (KR); KIA MOTORS CORPORATION, Seoul (KR)

(72) Inventors: Kyu Beom Ko, Incheon (KR); Seung Myun Chung, Seoul (KR); Tae Woo Lee, Siheung-si (KR); Jae Seok You, Seoul (KR); Deok Keun Shin, Yongin-si (KR); Jin Cheol Shin, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 364 days.

(21) Appl. No.: 15/814,712

(22) Filed: Nov. 16, 2017

(65) Prior Publication Data

US 2019/0001828 A1 Jan. 3, 2019

(30) Foreign Application Priority Data

Jul. 3, 2017 (KR) .......................... 10-2017-0084350

(51) Int. Cl.
*H01M 10/6571* (2014.01)
*H01M 10/625* (2014.01)
(Continued)

(52) U.S. Cl.
CPC ........... *B60L 11/187* (2013.01); *B60L 3/0046* (2013.01); *B60L 3/12* (2013.01); *B60L 58/25* (2019.02); *B60W 10/26* (2013.01); *G05D 23/19* (2013.01); *G05D 23/1917* (2013.01); *H01M 10/443* (2013.01); *H01M 10/486* (2013.01); *H01M 10/615* (2015.04); *H01M 10/625* (2015.04); *H01M 10/63* (2015.04); *H01M 10/6571* (2015.04); *B60L 1/02* (2013.01);
(Continued)

(58) Field of Classification Search
CPC ............ H01M 10/625; H01M 10/615; H01M 10/443; H01M 10/6571; H01M 10/63; H01M 10/486
See application file for complete search history.

(56) References Cited

U.S. PATENT DOCUMENTS 9,252,621 B2 2/2016 Miyano
2017/0057376 A1* 3/2017 Murata ................... B60L 58/27

FOREIGN PATENT DOCUMENTS

KR 10-0282883 B1 4/2001
KR 2014-0091624 A 7/2014

OTHER PUBLICATIONS

KR 10-0282883 B1 online machine translation as provided by K-PION, translated on Feb. 17, 2020.*

* cited by examiner

*Primary Examiner* — Golam Mowla
(74) *Attorney, Agent, or Firm* — Morgan, Lewis & Bockius LLP (57) ABSTRACT

A battery temperature control system includes: a memory storing a maximum charging current map according to temperature of a battery for an electric vehicle, and an allowable current map according to a control pilot (CP) duty; and a temperature controller comparing a maximum charging current corresponding to a current temperature of the battery with an allowable current corresponding to a current CP duty to determine whether to increase the temperature of the battery.

3 Claims, 6 Drawing Sheets

(51) Int. Cl.
*B60L 11/18* (2006.01)
*B60W 10/26* (2006.01)
*G05D 23/19* (2006.01)
*H01M 10/615* (2014.01)
*B60L 58/25* (2019.01)
*H01M 10/48* (2006.01)
*B60L 3/12* (2006.01)
*B60L 3/00* (2019.01)
*H01M 10/44* (2006.01)
*H01M 10/63* (2014.01)
*B60L 53/00* (2019.01)
*B60L 1/02* (2006.01)

(52) U.S. Cl.
CPC ......... *B60L 53/00* (2019.02); *B60L 2240/545* (2013.01); *B60L 2240/549* (2013.01); *H01M 2220/20* (2013.01)

BATTERY TEMPERATURE CONTROL SYSTEM AND METHOD

CROSS-REFERENCE TO RELATED APPLICATION

This application is based on and claims the benefit of priority to Korean Patent Application No. 10-2017-0084350, filed on Jul. 3, 2017, in the Korean Intellectual Property Office, the disclosure of which is incorporated herein in its entirety by reference.

TECHNICAL FIELD

The present disclosure relates to a battery temperature control system and method and, more particularly, to a technique for allowing for a rise in battery temperature only when necessary, while charging a battery for an electric vehicle at a low temperature, to thereby prevent unnecessary consumption of energy of the battery used for the rise in battery temperature.

BACKGROUND

A lithium polymer battery (LiPB) for power supply in electric vehicles is a secondary battery that uses a solid electrolyte having excellent ionic conductivity. The lithium polymer battery has advantages of low possibilities of electrolyte leakage and explosion risk, low internal resistance, and high energy density, and does not suffer a reduction in lifespan even without full charge/full discharge since it does not have a memory effect.

When the lithium polymer battery is charged at a low temperature, overvoltage of an anode and a cathode may be asymmetrically increased, such that compared to charging at room temperature, the charging capacity may be reduced, and a cathode voltage may be dropped to a substantially low voltage, causing eduction of metallic lithium. When this condition is repeated for a long period of time, the performance of the lithium polymer battery may deteriorate and a risk of an internal short circuit may be caused.

Thus, the temperature of the lithium polymer battery needs to be controlled in order to ensure efficient use, safety, and durability.

However, when a heater rapidly applies heat in order to increase the temperature of the lithium polymer battery, there may be a risk of fire, explosion, and the like. Therefore, a need exists for a system for efficiently controlling the heat of the heater according to temperature and other conditions of the lithium polymer battery.

A conventional battery temperature rising system increases the temperature of the battery unconditionally to a preset target temperature without determining whether to increase or decrease the temperature of the battery when the battery is charged at a low temperature. When considering that energy used for a rise in battery temperature in an electric vehicle is supplied from the battery, increasing the temperature of the battery even when there is no need for the rise in battery temperature may cause unnecessary discharge of the battery.

SUMMARY

The present disclosure has been made to solve the above-mentioned problems occurring in the prior art while advantages achieved by the prior art are maintained intact.

An aspect of the present disclosure provides a battery temperature control system and method that can allow for a rise in battery temperature only when necessary, while charging a battery for an electric vehicle by determining whether to increase the battery temperature on the basis of a maximum charging current according to the battery temperature and an allowable current of a charger, to thereby prevent unnecessary consumption of energy of the battery used for the rise in battery temperature, and improve charging efficiency of the battery.

The objects of the present disclosure are not limited to the foregoing objects, and any other objects and advantages not mentioned herein will be clearly understood from the following description. The present inventive concept will be more clearly understood from exemplary embodiments of the present disclosure. In addition, it will be apparent that the objects and advantages of the present disclosure can be achieved by elements and features claimed in the claims and a combination thereof.

According to an aspect of the present disclosure, a battery temperature control system includes: a memory storing a maximum charging current map according to temperature of a battery for an electric vehicle, and an allowable current map according to a control pilot (CP) duty; and a temperature controller comparing a maximum charging current corresponding to a current temperature of the battery with an allowable current corresponding to a current CP duty to determine whether to increase the temperature of the battery.

The temperature controller may control a temperature rising device to increase the temperature of the battery when the maximum charging current corresponding to the current temperature of the battery is lower than the allowable current corresponding to the current CP duty. The temperature controller may set a target temperature of the temperature rising device to allow the maximum charging current corresponding to the current temperature of the battery to be the allowable current corresponding to the current CP duty when increasing the temperature of the battery.

The temperature controller may control a temperature rising device to increase the temperature of the battery when a battery cell voltage is lower than a cut-off voltage and the maximum charging current corresponding to the current temperature of the battery is lower than the allowable current corresponding to the current CP duty. The temperature controller may set a target temperature of the temperature rising device to allow the maximum charging current corresponding to the current temperature of the battery to be the allowable current corresponding to the current CP duty when increasing the temperature of the battery.

According to another aspect of the present disclosure, a battery temperature control system includes: a memory storing a maximum charging current map according to temperature of a battery for an electric vehicle; and a temperature controller comparing a maximum charging current corresponding to a current temperature of the battery with an allowable current received from a charger through a vehicle network to determine whether to increase the temperature of the battery.

The temperature controller may control a temperature rising device to increase the temperature of the battery when the maximum charging current corresponding to the current temperature of the battery is lower than the allowable current of the charger. The temperature controller may set a target temperature of the temperature rising device to allow the maximum charging current corresponding to the current temperature of the battery to be an allowable current corresponding to a current CP duty when increasing the temperature of the battery.

The temperature controller may control a temperature rising device to increase the temperature of the battery when a battery cell voltage is lower than a cut-off voltage and the maximum charging current corresponding to the current temperature of the battery is lower than the allowable current of the charger. The temperature controller may set a target temperature of the temperature rising device to allow the maximum charging current corresponding to the current temperature of the battery to be an allowable current corresponding to a current CP duty when increasing the temperature of the battery.

According to another aspect of the present disclosure, a battery temperature control method includes steps of: storing, by a memory, a maximum charging current map according to temperature of a battery for an electric vehicle, and an allowable current map according to a CP duty; and determining, by a temperature controller, whether to increase the temperature of the battery by comparing a maximum charging current corresponding to a current temperature of the battery with an allowable current corresponding to a current CP duty.

The determining step may include controlling a temperature rising device to increase the temperature of the battery when the maximum charging current corresponding to the current temperature of the battery is lower than the allowable current corresponding to the current CP duty. The determining step may include setting a target temperature of the temperature rising device to allow the maximum charging current corresponding to the current temperature of the battery to be the allowable current corresponding to the current CP duty when increasing the temperature of the battery.

The determining step may include controlling a temperature rising device to increase the temperature of the battery when a battery cell voltage is lower than a cut-off voltage and the maximum charging current corresponding to the current temperature of the battery is lower than the allowable current corresponding to the current CP duty. The determining step may include setting a target temperature of the temperature rising device to allow the maximum charging current corresponding to the current temperature of the battery to be the allowable current corresponding to the current CP duty when increasing the temperature of the battery.

The determining step may include determining whether to increase the temperature of the battery by comparing the maximum charging current corresponding to the current temperature of the battery with an allowable current received from a charger through a vehicle network when the current CP duty is outside of a valid section of the allowable current map. The determining step may include controlling a temperature rising device to increase the temperature of the battery when the maximum charging current corresponding to the current temperature of the battery is lower than the allowable current of the charger. The determining step may include setting a target temperature of the temperature rising device to allow the maximum charging current corresponding to the current temperature of the battery to be an allowable current corresponding to a current CP duty when increasing the temperature of the battery.

The determining step may include controlling a temperature rising device to increase the temperature of the battery when a battery cell voltage is lower than a cut-off voltage and the maximum charging current corresponding to the current temperature of the battery is lower than the allowable current of the charger. The determining step may include setting a target temperature of the temperature rising device to allow the maximum charging current corresponding to the current temperature of the battery to be an allowable current corresponding to a current CP duty when increasing the temperature of the battery.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

According to exemplary embodiments of the present disclosure, an electric vehicle is run by driving an electric motor with power from a high voltage battery, and receives electricity from an external charging station to charge the high voltage battery. Here, the electric vehicle may include an electric vehicle (EV), a plug-in hybrid electric vehicle (PHEV), and the like.

Figure 1:
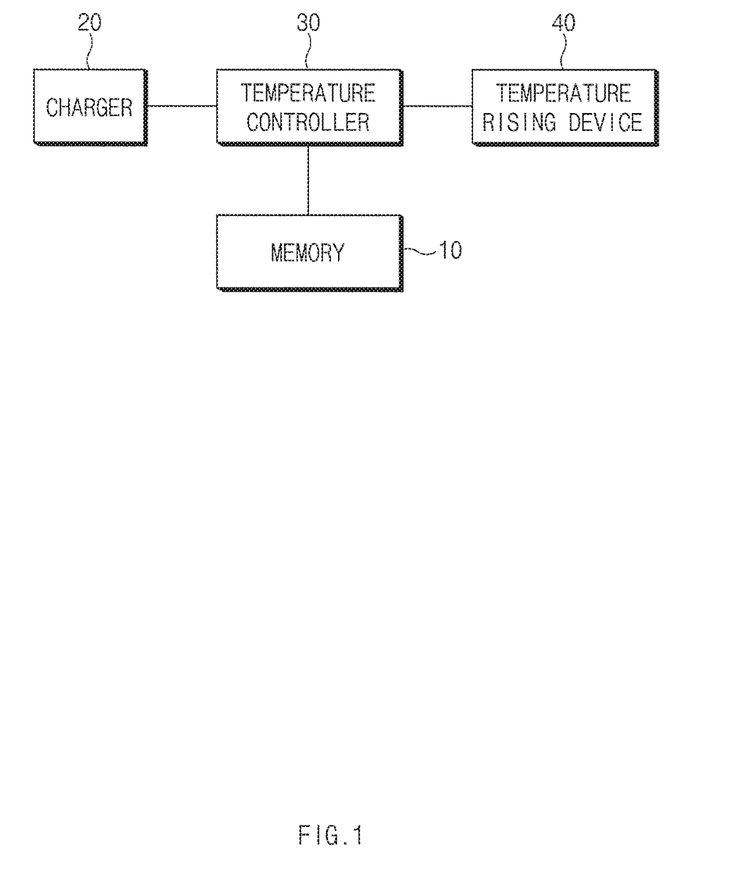
FIG. 1 illustrates the configuration of a battery temperature control system, according to an exemplary embodiment of the present disclosure.

FIG. 1 illustrates the configuration of a battery temperature control system, according to an exemplary embodiment of the present disclosure.

As illustrated in FIG. 1, the battery temperature control system, according to the exemplary embodiment of the present disclosure, includes a memory 10, a charger 20, a temperature controller 30, and a temperature rising device 40.

With regard to each of the aforementioned elements, the memory 10 may store a map (hereinafter referred to as the "maximum charging current map") in which a maximum charging current is recorded according to temperature of a battery for an electric vehicle. Here, the maximum charging current refers to a maximum current with which the battery can be charged. For example, when a maximum charging current is 200 A, the battery may be charged to 200 A or less.

Figure 2:
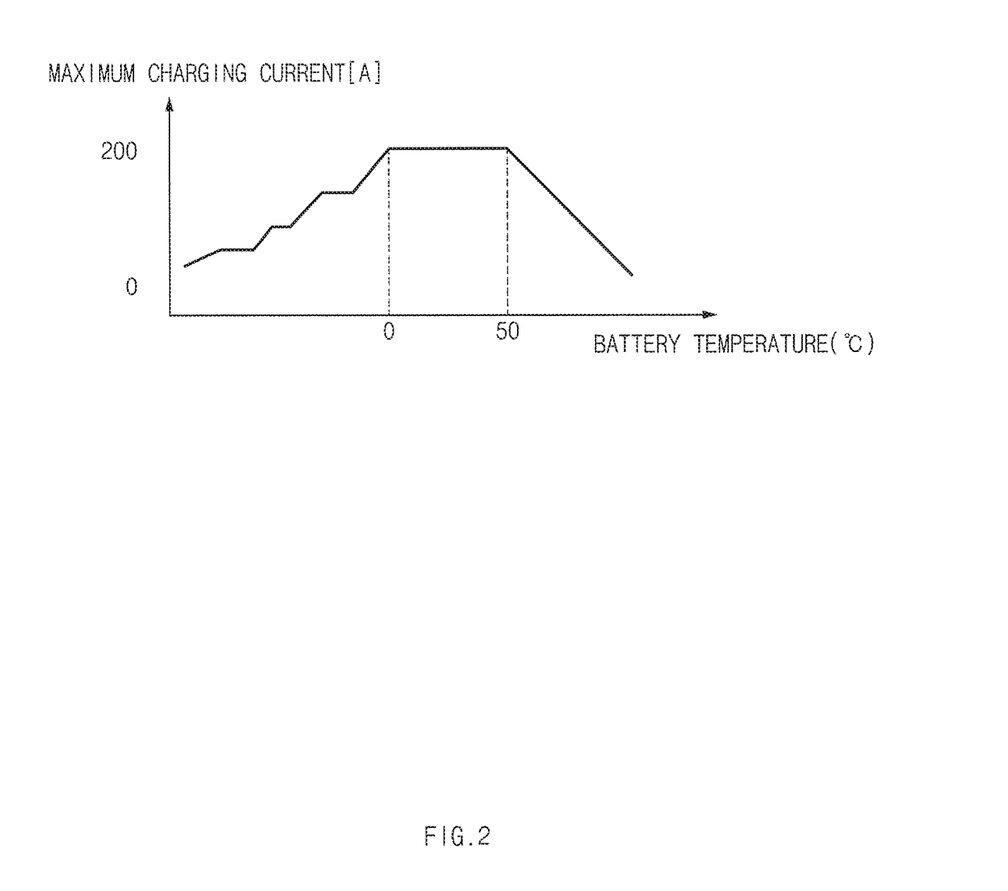
FIG. 2 illustrates an example of a maximum charging current map according to temperature of a battery for an electric vehicle, according to an exemplary embodiment of the present disclosure.

An example of such a maximum charging current map is illustrated in FIG. 2.

FIG. 2 illustrates an example of a maximum charging current map according to temperature of a battery for an electric vehicle, according to an exemplary embodiment of the present disclosure. In FIG. 2, a vertical axis represents the maximum charging current, and a horizontal axis represents the temperature of the battery. As illustrated in FIG. 2, the charging current is the highest in a specific section (for example, battery temperature of 0 to 50 degrees), and the maximum charging current may gradually be lowered when the battery temperature is outside of the specific section.

In addition, the memory 10 may store a map (hereinafter referred to as the "allowable current map") in which an allowable current of a charger is recorded according to a duty (hereinafter referred to as the "CP duty") of a control pilot (CP) signal (or voltage). Here, the allowable current refers to a charging current allowed by the charger when charging the battery.

Figure 3:
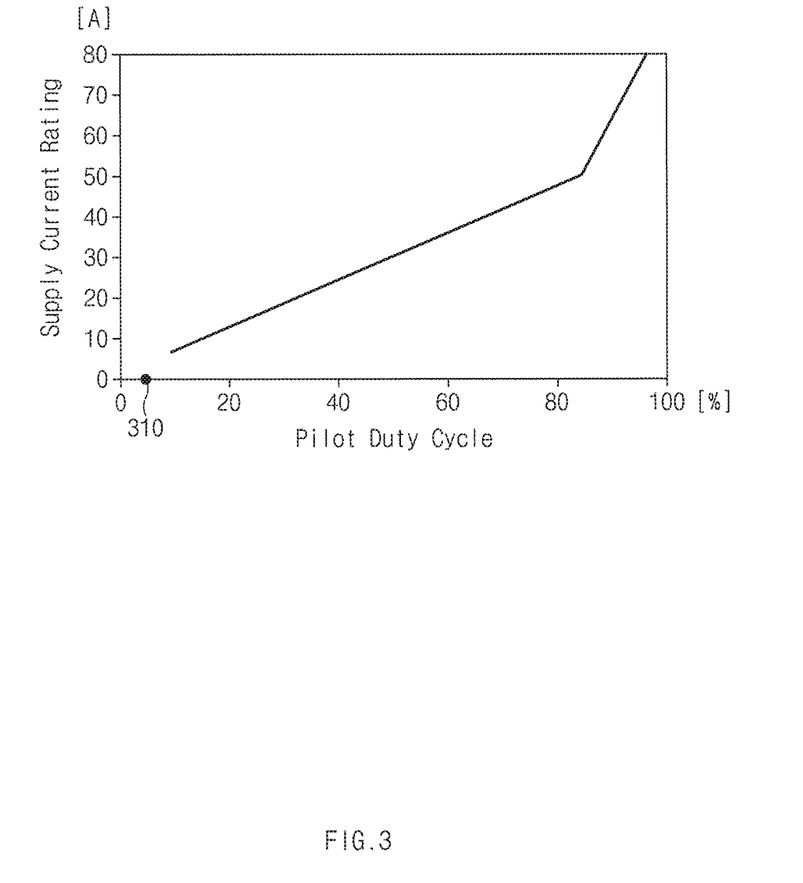
FIG. 3 illustrates an example of an allowable current map according to control pilot (CP) duty, in a battery temperature control system, according to an exemplary embodiment of the present disclosure.

An example of such an allowable current map is illustrated in FIG. 3.

FIG. 3 illustrates an example of an allowable current map according to CP duty, in a battery temperature control system, according to an exemplary embodiment of the present disclosure. In FIG. 3, a vertical axis represents the allowable current, and a horizontal axis represents the CP duty. An allowable current corresponding (matching) to each CP duty in a specific section (for example, CP duty of 10% to 95%) is recorded as illustrated in FIG. 3, and when a CP duty detected based on a CP signal received from the charger is included in the specific section, it may refer to "slow charging" (charging to maximum 80 A or less). For example, when a CP duty is 5% (see "310" in FIG. 3), it may be considered "quick charging". In this case, instead of using the allowable current map, an allowable current (for example, 125 A) received from the charger through a vehicle network may be used.

Here, the vehicle network may include a controller area network (CAN), a local interconnect network (LIN), FlexRay, and media oriented systems transport (MOST). In addition, for quick charging, power line communication (PLC), instead of CAN communication, may be applied.

In other words, the memory 10 may store the maximum charging current map according to the battery temperature, and the allowable current map according to the CP duty.

The memory 10 may store a program for operating the temperature controller 30, and may temporarily store data received from the charger 20 and data to be transmitted to the temperature rising device 40.

In addition, the memory 10 may include at least one of a flash memory, a hard disk, a solid state disk (SSD), a silicon disk drive (SDD), a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the exemplary embodiment of the present disclosure, the memory 10 may be provided as a separate element, independent of the temperature controller 30. Alternatively, the memory 10 may be provided inside the temperature controller 30. Further, the temperature controller 30 may include or may be integrated with an electronic control unit (ECU).

The charger 20 may be an external charging station or a home charging station, electric vehicle supply equipment (EVSE), and include an in-cable control box (ICCB), a charging circuit interrupt device (CCID), and the like, capable of charging the battery of the electric vehicle.

The charger 20 may be connected to an on-board charger (OBC) (not shown) of the electric vehicle through a connector to supply voltage. Here, the OBC may include a high voltage switch, an inductor, a capacitor, an isolated transformer, a relay, and the like.

In addition, the OBC may be connected to the EVSE, receive commercial AC power from the EVSE, and convert the AC power to DC power. To this end, the OBC may receive a CP voltage from the EVSE to check a voltage level.

The temperature controller 30 generally controls the aforementioned respective elements to perform the functions thereof normally.

In addition, the temperature controller 30 may detect a CP duty on the basis of a CP signal received from the charger 20.

The temperature controller 30 may determine whether to increase the temperature of the battery on the basis of the maps stored in the memory 10, that is, the maximum charging current map according to the temperature of the battery and the allowable current map according to the CP duty, and set a target temperature.

For example, when a maximum charging current of the battery is 20 A at a current temperature and an allowable current corresponding to a current CP duty is 30 A, the temperature controller 30 may increase the temperature of the battery to allow the maximum charging current of the battery to be 30 A. In other words, the temperature controller 30 may set a target temperature of the temperature rising device 40 to allow the maximum charging current of the battery to be 30 A.

For example, when a maximum charging current of the battery is 10 A at a current temperature and an allowable current corresponding to a current CP duty is 6 A, the temperature controller 30 may not increase the temperature of the battery. Since the battery is able to accept the allowable current provided by the charger 20, it is not necessary to increase the temperature of the battery to increase the maximum charging current. In other words, the allowable current corresponding to the CP duty may have a high priority relative to the maximum charging current of the battery.

In addition, when a CP duty is outside of a valid section (for example, 10%-95%) in the allowable current map, the temperature controller 30 may consider it as quick charging, determine whether to increase the temperature of the battery on the basis of an allowable current received from the charger 20 through the vehicle network and the maximum charging current map of the battery, and set a target temperature of the temperature rising device 40.

For example, when a maximum charging current of the battery is 40 A at a current temperature and an allowable current of the charger is 125 A, the temperature controller 30 may increase the temperature of the battery to allow the maximum charging current of the battery to be 125 A. In other words, the temperature controller 30 may set a target temperature of the temperature rising device 40 to allow the maximum charging current of the battery to be 125 A.

The above-described process of controlling, by the temperature controller 30, the temperature of the battery does not consider a cut-off voltage (voltage at which a charging current is cut) of a battery cell. If the cut-off voltage of the battery cell is additionally considered, the cut-off voltage of the battery cell may be a top priority. For example, the cut-off voltage may be 4.14V, but may vary according to types and characteristics of the battery.

For example, even though a maximum charging current of the battery is 20 A at a current temperature and an allowable current corresponding to a current CP duty is 30 A, when a battery cell voltage is equal to a cut-off voltage, the temperature controller 30 may not increase the temperature of the battery. When the battery cell voltage is lower than the cut-off voltage, the temperature controller 30 may increase the temperature of the battery to allow the maximum charging current of the battery to be 30 A.

For example, even though a maximum charging current of the battery is 40 A at a current temperature and an allowable current of the charger is 125 A, when a battery cell voltage is equal to a cut-off voltage, the temperature controller 30 may not increase the temperature of the battery. When the battery cell voltage is lower than the cut-off voltage, the temperature controller 30 may increase the temperature of the battery to allow the maximum charging current of the battery to be 125 A.

Figure 4:
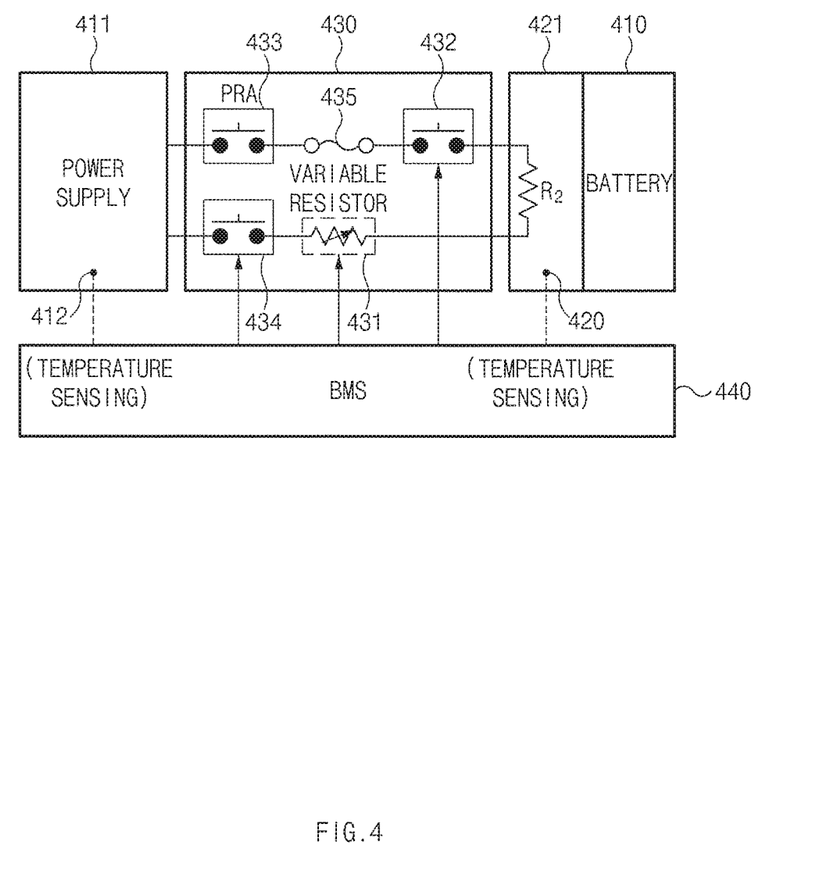
FIG. 4 illustrates the configuration of a battery temperature rising system, according to an exemplary embodiment of the present disclosure.

Here, the temperature controller 30 may obtain the cell voltage and the cut-off voltage of the battery cell from a battery management system (BMS) of the temperature rising device 40.

The temperature rising device 40 may increase the temperature of the battery under the control of the temperature controller 30.

Hereinafter, the configuration of the temperature rising device 40 will be described with reference to FIG. 4.

FIG. 4 illustrates the configuration of a battery temperature rising system, according to an exemplary embodiment of the present disclosure.

As illustrated in FIG. 4, the battery temperature rising system, according to an exemplary embodiment of the present disclosure, includes: a power supply 411 operating a heater 421 which is attached to a battery 410 and generates heat to increase the temperature of the battery 410; a variable resistor 431 provided on a circuit between the power supply 411 and the heater 421, and adjusting the amount of heat generated by the heater 421 according to adjustment of a resistance value; a heater relay 432 provided on the circuit between the power supply 411 and the heater 421 and opening or closing the circuit to selectively turn the heater 421 on/off; a first sensor 412 sensing the temperature of the battery; a second sensor 420 sensing the temperature of the heater; and a battery management system (BMS) 440 outputting a control signal for controlling the operation of the heater relay 432 to selectively turn the heater 421 on/off according to temperature information sensed by the sensors 412 and 420, and a control signal for controlling the resistance value of the variable resistor 431.

Figure 5:
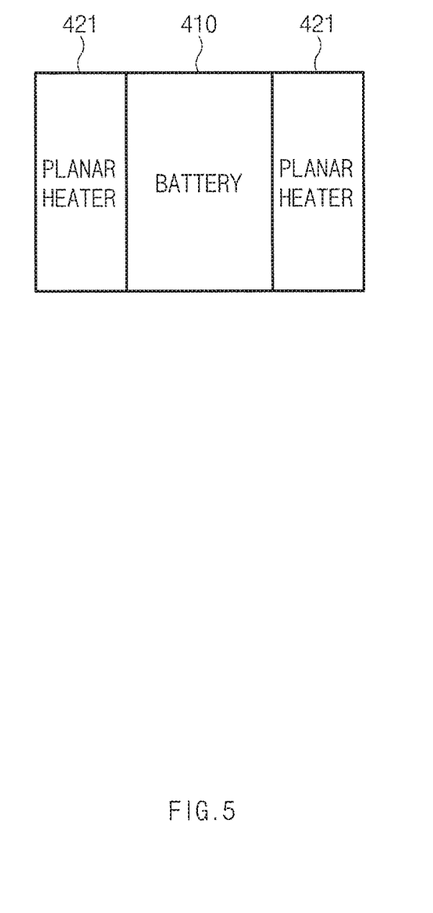
FIG. 5 illustrates the structure of a battery and a planar heater, according to an exemplary embodiment of the present disclosure.

Here, the heater 421 may be a planar heater receiving power from the battery 410 to operate as a heater. The planar heater 421 may be attached to the battery 410 to increase the temperature of the battery 410 as illustrated in FIG. 5.

The power supply 411 for the operation of the planar heater 421 may be provided from the battery 410, and a power relay assembly (PRA) for switching the battery power to be selectively supplied to the vehicle may be connected to a DC link terminal of the battery 410.

The PRA may be provided to selectively open or close the power supply 411 of the battery 410 on the DC circuit that connects between the power supply 411 of the battery 410 and the heater 421, and include a plurality of high voltage relays and a fuse.

Here, the PRA may include two high voltage main relays 433 and 434 which may be a main power contact, a fuse 435, and a heater relay (temperature rising relay) 432 selectively operating the heater 421.

Each of the relays 432, 433, and 434 of the PRA may be turned on/off on the basis of the relay control signal output by the BMS 440. Here, the BMS 440 may be a battery controller collecting battery state information.

The BMS 440 may adjust the temperature of the battery 410 on the basis of a control signal from the temperature controller 30.

The BMS 440 may receive the battery temperature (battery cell temperature) and the heater temperature sensed by the sensors 412 and 420, respectively, and output the control signal for turning the heater relay 432 on/off on the basis of the temperature information sensed by the sensors 412 and 420, in particular, the battery temperature.

The BMS 440 may output the control signal for adjusting the resistance value of the variable resistor 431. The variable resistor 431 may be provided on the circuit (power supply circuit) between the power supply 411 of the battery 410 and the heater 421, and the resistance value thereof may be adjusted on the basis of the control signal of the BMS 440.

The BMS 440 may also output the control signal for adjusting the resistance value of the variable resistor 431 on the basis of the battery temperature and the heater temperature sensed by the sensors 412 and 420.

The BMS 440 may collect the battery state information such as the voltage, current, temperature, and state of charge (SOC) of the battery cell, and provide the collected battery state information to internal/external controllers of the vehicle such that the collected battery state information may be used for charge/discharge control, vehicle control, or the like.

The BMS 440 may receive power from the OBC, and determine whether to charge the battery 410 for an electric vehicle according to a preset program. Here, the BMS 440 may calculate an average voltage level by sampling CP voltages received by the OBC to determine whether to charge the battery. To this end, the BMS 440 may be at least one processor that operates according to the preset program.

The battery 410 may be mounted in a hybrid vehicle or an electric vehicle to supply power to a drive motor. The battery 410 may be a battery pack in which battery cells are connected in series according to required capacity of the battery.

Figure 6:
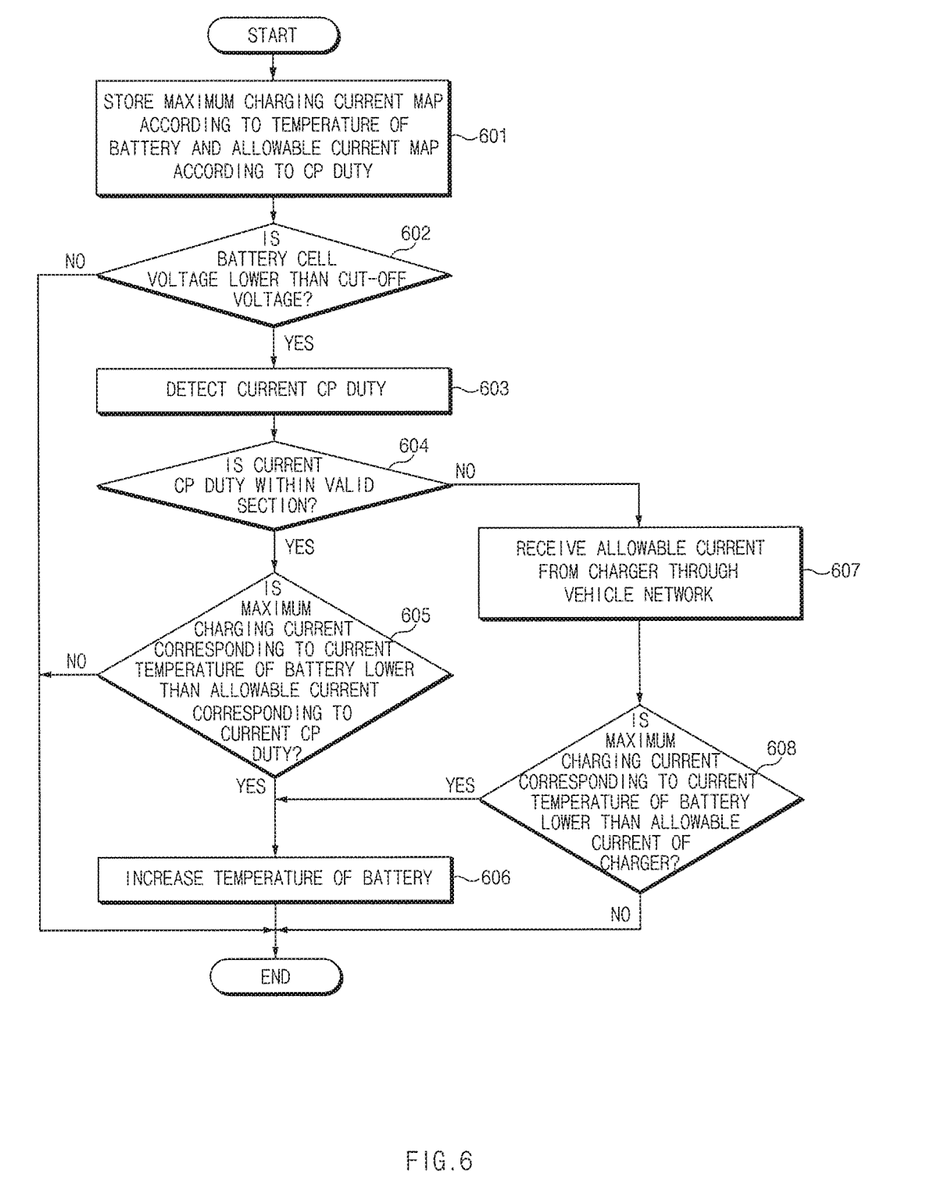
FIG. 6 illustrates a flowchart of a battery temperature control method, according to an exemplary embodiment of the present disclosure.

FIG. 6 illustrates a flowchart of a battery temperature control method, according to an exemplary embodiment of the present disclosure. It shows a process performed by the temperature controller 30.

First of all, the memory 10 may store a maximum charging current map according to temperature of a battery for an electric vehicle and an allowable current map according to a CP duty in operation 601.

Next, the temperature controller 30 may determine whether a battery cell voltage is lower than a cut-off voltage in operation 602.

As a result of operation 602, when the battery cell voltage is higher than or equal to the cut-off voltage, the temperature controller 30 may end the process. In other words, when the battery cell voltage is higher than or equal to the cut-off voltage, the temperature controller 30 may determine it as "derating" due to deterioration of the battery, rather than due to the temperature of the battery, and thus may not adjust the temperature of the battery.

As a result of operation 602, when the battery cell voltage is lower than the cut-off voltage, a CP duty may be detected on the basis of a CP signal received from the charger in operation 603. The detected CP duty may be referred to as a current CP duty.

Thereafter, it may be determined whether the detected current CP duty is within a valid section of the allowable current map according to the CP duty stored in the memory 10 in operation 604. Here, when there is an allowable current matched with the current CP duty on the allowable current map according to the CP duty, it may be determined that the current CP duty is within the valid section, and when there is no allowable current matched with the current CP duty on the allowable current map according to the CP duty, it may be determined that the current CP duty is outside of the valid section.

As a result of operation 604, when the current CP duty is within the valid section, it may be determined whether a maximum charging current corresponding to a current temperature of the battery is lower than the allowable current corresponding to the current CP duty in operation 605. Here, the current temperature of the battery may be obtained from the BMS 440 of the temperature rising device 40.

As a result of operation 605, when the maximum charging current corresponding to the current temperature of the battery is higher than or equal to the allowable current corresponding to the current CP duty, the temperature controller 30 may end the process.

As a result of operation 605, when the maximum charging current corresponding to the current temperature of the battery is lower than the allowable current corresponding to the current CP duty the current temperature of the battery, the temperature rising device 40 may be controlled to increase the temperature of the battery in operation 606.

As a result of operation 604, when the current CP duty is outside of the valid section, an allowable current may be received from the charger 20 through the vehicle network in operation 607.

Then, it may be determined whether the maximum charging current corresponding to the current temperature of the battery is lower than the allowable current of the charger 20 in operation 608.

As a result of operation 608, when the maximum charging current corresponding to the current temperature of the battery is lower than the allowable current of the charger 20, the temperature controller 30 may return to operation 606, and when the maximum charging current corresponding to the current temperature of the battery is higher than or equal to the allowable current of the charger 20, the temperature controller may end the process.

As set forth above, the battery temperature control system and method, according to exemplary embodiments of the present disclosure, can allow for a rise in battery temperature only when necessary, while charging a battery for an electric vehicle by determining whether to increase the battery temperature on the basis of a maximum charging current according to the battery temperature and an allowable current of a charger, to thereby prevent unnecessary consumption of energy of the battery used for the rise in battery temperature.

In addition, the battery temperature control system and method, according to exemplary embodiments of the present disclosure, can allow for a rise in battery temperature only when necessary, while charging a battery for an electric vehicle by determining whether to increase the battery temperature on the basis of a maximum charging current according to the battery temperature and an allowable current of a charger, to thereby prevent unnecessary consumption of energy of the battery used for the rise in battery temperature, and improve charging efficiency of the battery.

In addition, the battery temperature control system and method, according to exemplary embodiments of the present disclosure, can allow for a rise in battery temperature only when necessary, while charging a battery for an electric vehicle by determining whether to increase the battery temperature on the basis of a maximum charging current according to the battery temperature and an allowable current of a charger, to thereby remove an unnecessary temperature rising operation.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A battery temperature control system, comprising:
a memory storing a maximum charging current map according to temperature of a battery for an electric vehicle, and storing an allowable current map according to a control pilot (CP) duty; and
a temperature controller comparing a maximum charging current corresponding to a current temperature of the battery with an allowable current corresponding to a current CP duty to determine whether to increase the temperature of the battery,
wherein the temperature controller controls a temperature rising device to increase the temperature of the battery when the maximum charging current corresponding to the current temperature of the battery is lower than the allowable current corresponding to the current CP duty, and
wherein the temperature controller sets a target temperature of the temperature rising device to allow the maximum charging current corresponding to the current temperature of the battery to be the allowable current corresponding to the current CP duty when increasing the temperature of the battery.

2. The battery temperature control system according to claim 1, wherein the temperature controller controls a temperature rising device to increase the temperature of the battery when a battery cell voltage is lower than a cut-off voltage and the maximum charging current corresponding to the current temperature of the battery is lower than the allowable current corresponding to the current CP duty.

3. The battery temperature control system according to claim 2, wherein the temperature controller sets a target temperature of the temperature rising device to allow the maximum charging current corresponding to the current temperature of the battery to be the allowable current corresponding to the current CP duty when increasing the temperature of the battery.

* * * * *